US008484224B1

(12) United States Patent
Harris et al.

(10) Patent No.: US 8,484,224 B1
(45) Date of Patent: Jul. 9, 2013

(54) SYSTEM AND METHOD FOR RANKING GEOFEEDS AND CONTENT WITHIN GEOFEEDS

(71) Applicants: Philip B. Harris, Naples, FL (US); Scott K. Mitchell, Naples, FL (US); Michael J. Mulroy, Glencoe, IL (US)

(72) Inventors: Philip B. Harris, Naples, FL (US); Scott K. Mitchell, Naples, FL (US); Michael J. Mulroy, Glencoe, IL (US)

(73) Assignee: Geofeedr, Inc., Naples, FL (US)

( * ) Notice: Subject to any disclaimer, the term of this patent is extended or adjusted under 35 U.S.C. 154(b) by 0 days.

(21) Appl. No.: 13/708,404

(22) Filed: Dec. 7, 2012

(51) Int. Cl.
*G06F 17/00* (2006.01)

(52) U.S. Cl.
USPC .......................... 707/748; 707/723; 709/217

(58) Field of Classification Search
USPC .................... 707/748, 723; 709/217
See application file for complete search history.

(56) References Cited

U.S. PATENT DOCUMENTS

| 8,103,741 | B2 | 1/2012 | Frazier et al. ................. 709/217 |
| 8,341,223 | B1 | 12/2012 | Patton et al. ................. 709/204 |
| 2002/0029226 | A1* | 3/2002 | Li et al. ....................... 707/104.1 |
| 2003/0088609 | A1 | 5/2003 | Guedalia et al. ............. 709/107 |
| 2004/0203854 | A1 | 10/2004 | Nowak ....................... 455/456.1 |
| 2004/0225635 | A1 | 11/2004 | Toyama et al. .................... 707/1 |
| 2006/0002317 | A1 | 1/2006 | Punaganti Venkata ...... 370/310 |
| 2006/0200305 | A1 | 9/2006 | Sheha et al. .................. 701/200 |
| 2007/0210937 | A1 | 9/2007 | Smith et al. ................. 340/995.1 |
| 2007/0276919 | A1* | 11/2007 | Buchmann et al. .......... 709/217 |
| 2008/0092054 | A1 | 4/2008 | Bhumkar et al. ............. 715/739 |
| 2009/0300528 | A1 | 12/2009 | Stambaugh .................. 715/764 |
| 2010/0076968 | A1 | 3/2010 | Boyns et al. .................. 707/732 |
| 2010/0153410 | A1 | 6/2010 | Jin et al. ....................... 707/758 |
| 2011/0010674 | A1 | 1/2011 | Knize et al. .................. 715/849 |
| 2011/0078584 | A1 | 3/2011 | Winterstein et al. ......... 715/751 |
| 2011/0113096 | A1 | 5/2011 | Long et al. .................... 709/204 |
| 2012/0047219 | A1 | 2/2012 | Feng et al. .................... 709/207 |
| 2012/0078503 | A1 | 3/2012 | Dzubay et al. ............... 701/410 |
| 2012/0084323 | A1 | 4/2012 | Epshtein et al. ............. 707/776 |
| 2012/0150901 | A1 | 6/2012 | Johnson et al. .............. 707/769 |
| 2012/0166367 | A1 | 6/2012 | Murdock et al. ............... 706/12 |

(Continued)

FOREIGN PATENT DOCUMENTS

| EP | 1 045 345 | 10/2000 |
| WO | WO 99/15995 | 4/1999 |
| WO | WO 2010/049918 | 5/2010 |

OTHER PUBLICATIONS

U.S. Appl. No. 13/619,888, a non-final Office Action, mailed Mar. 1, 2013, 15 pages.

(Continued)

*Primary Examiner* — Belix M Ortiz Ditren
(74) *Attorney, Agent, or Firm* — Pillsbury Winthrop Shaw Pittman LLP

(57) ABSTRACT

A system and method for ranking geofeed results is provided. A geofeed includes a collection of content, aggregated from various content providers, that is relevant to one or more geographically definable locations. The generated content may include, for example, video, audio, images, text, hyperlinks, and/or other content that may be relevant to a geographically definable location. The content providers may include, for example, social media platforms, online knowledge databases, individual content creators, and/or other providers that can distribute content that may be relevant to a geographically definable location. The system may rank a plurality of geofeeds based on attributes of individual geofeeds or content within each geofeed, rank content within a geofeed based on attributes of the content, display the ranked geofeeds, and/or display the ranked content within a geofeed.

30 Claims, 5 Drawing Sheets

U.S. PATENT DOCUMENTS

| | | | |
|---|---|---|---|
| 2012/0221687 A1 | 8/2012 | Hunter et al. | 709/219 |
| 2013/0018957 A1 | 1/2013 | Parnaby et al. | 709/204 |
| 2013/0073388 A1 | 3/2013 | Heath | 705/14.53 |
| 2013/0110631 A1 | 5/2013 | Mitchell et al. | 705/14.58 |

OTHER PUBLICATIONS

U.S. Appl. No. 13/708,516, a non-final Office Action, mailed May 15, 2013, 11 pages.

Chow et al., "Towards Location-Based Social Networking Services", *LBSN 2010 Proceedings of the 2nd ACM SIGSPATIAL International Workshop on Location Based Social Networks*, Nov. 2, 2010, pp. 31-38.

Bao, Jie, et al., "GeoFeed: A Location-Aware News Feed System", IEEE Xplore® Digital Library, Published in *2012 IEEE 28th International Conference on Data Engineering*, Apr. 1-5, 2012, 14 pages.

Sarwat, Mohamed, et al., "Sindbad: A Location-Based Social Networking System", *SIGMOD '12*, Scottsdale, Arizona, May 20-24, 2012, 4 pages.

U.S. Appl. No. 13/284,455, non-final Office Action, mailed Jan. 7, 2013, 18 pages.

\* cited by examiner

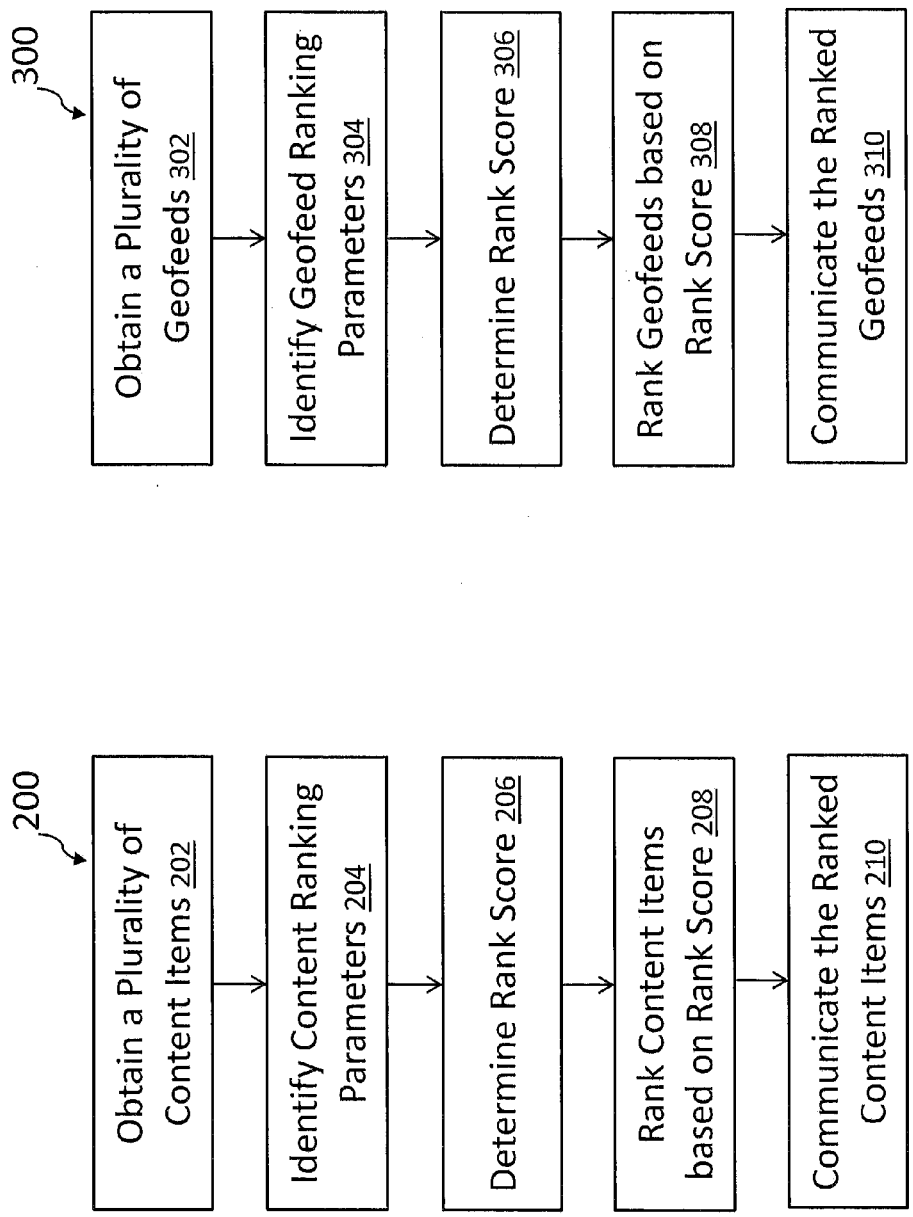

SYSTEM AND METHOD FOR RANKING GEOFEEDS AND CONTENT WITHIN GEOFEEDS

RELATED APPLICATIONS

This application is related to co-pending U.S. patent application Ser. No. 13/708,516, concurrently filed herewith, entitled "SYSTEM AND METHOD FOR LOCATION MONITORING BASED ON ORGANIZED GEOFEEDS," and co-pending U.S. patent application Ser. No. 13/708,466, concurrently filed herewith, entitled "SYSTEM AND METHOD FOR GENERATING AND MANAGING GEOFEED-BASED ALERTS," both of which are incorporated by reference in their entireties herein.

FIELD OF THE INVENTION

The disclosure relates to systems and methods for ranking geofeeds and/or content of geofeeds, including content that is related to geographically definable locations and is aggregated from a plurality of social media or other content providers.

BACKGROUND OF THE INVENTION

The availability of content such as videos, audio files, photos, text, and/or other content over networks such as the Internet has grown at impressive rates. Many Internet and other online service providers make this type of content available to enable users to post and share such content through their services. However, various limitations exist with respect to how this vast amount of information can be effectively monitored and/or selectively displayed.

Because of the large amount of information available from social networks and other information providers, organizing, ranking, and displaying the organized content in a meaningful way can be difficult. These and other problems exist.

SUMMARY OF THE INVENTION

The disclosure relates to systems and methods for ranking geofeeds and/or content of geofeeds, including content that is related to geographically definable locations and is aggregated from a plurality of social media or other content providers.

In some embodiments, the system may include a computer that facilitates ranking of geofeeds and/or content within a geofeed. The computer may include one or more processors configured to perform some or all of a functionality of a plurality of modules. For example, the one or more processors may be configured to execute a geofeed creation module, a rank module, a communication module, a user interface module, and/or other modules.

The geofeed creation module may be configured to receive a request to create a geofeed based on a specification of one or more geo-locations. The request may include one or more geofeed parameters, one or more ranking parameters and/or other parameters. The one or geofeed parameters may be used to filter content into the geofeed and/or out of the geofeed. The ranking parameters may specify whether and/or how geofeeds and/or content within a geofeed should be ranked.

The geofeed creation module may generate a geofeed definition that includes the specification of the one or more geo-locations, the one or more geofeed parameters, the one or more ranking parameters, and/or other information related to the geofeed. The geofeed definition may be updated. For example, the specification of the one or more geo-locations, the one or more geofeed parameters, the one or more ranking parameters, and/or other information of the geofeed definition may be updated. In this manner, various parameters related to geofeeds may be defined or updated at the time of specifying the geofeeds and/or after the geofeeds have been specified.

To create the geofeed, the geofeed creation module may obtain the specification of the one or more geo-locations from the geofeed definition and generate requests that specify the one or more geo-locations specifically for individual ones of the plurality of content providers. In some embodiments, the geofeed creation module may create a single geofeed having a plurality of geo-locations that are grouped with respect to one another. In other embodiments, the geofeed creation module may create multiple distinct geofeeds, which may each be associated with one or more geo-locations that are grouped with respect to one another. In these embodiments, each set of individual content may correspond to a single geofeed.

The rank module may be configured to rank content within a geofeed based on the one or more ranking parameters that specify one or more content attributes that should be used, individually or in combination, to rank the content. The content attributes may describe various attributes of the content such as, for example, temporal content attributes (e.g., when content was created), spatial content attributes (e.g., where content was created), content popularity (e.g., number of views, requests, etc.), content type (e.g., whether the content is video, audio, text, etc.), subject matter content attributes (e.g., the subject matter of the content), identification content attributes (e.g., who created or provided the content), and/or other content attributes. In this manner, aggregated content within a geofeed may be ranked with respect to other content such that higher-ranking content may be highlighted or otherwise emphasized.

The rank module may be configured to rank geofeeds with respect to other geofeeds based on the one or more ranking parameters that specify geofeed attributes that should be used, either individually or in combination, to rank geofeeds. The geofeed attributes may describe various attributes of the geofeed such as, for example, temporal geofeed attributes (e.g., when a geofeed was created), spatial geofeed attributes (e.g., geo-locations of the geofeed), geofeed popularity (e.g., number of geofeed views, requests, etc.), subject matter geofeed attributes (e.g., the subject matter of the geofeed), identification content attributes (e.g., who created the geofeed), and/or other geofeed attributes. In this manner, geofeeds as a whole may be ranked with respect to other geofeeds such that higher-ranking geofeeds may be highlighted or otherwise emphasized such as being sorted.

The rank module may be configured to rank geofeeds with respect to other geofeeds based on cumulative content attributes related to each geofeed. For example, the rank module may be configured to rank geofeeds based on content attributes of their respective content instead of or in addition to geofeed attributes. In this manner, a geofeed may be ranked with respect to another geofeed based on their respective content.

The communication module may be configured to communicate the ranked content within a geofeed and/or ranked geofeeds via one or more communication channels. The communication module may include the user interface module such that geofeeds and/or content may be communicated via the user interface module.

The user interface module may be configured to generate a user interface that displays the ranked content within a geofeed and/or the ranked geofeeds. For example, the user interface module may display the ranked content and/or geofeeds via a map view that highlights or otherwise differentially displays higher-ranked content from lower-ranked content on a map, a collage view that highlights or otherwise differentially displays higher-ranked content from lower-ranked content on a collage display, a list view that highlights or otherwise differentially displays higher-ranked content from lower-ranked content on a list, and/or other views.

In some embodiments, the user interface module may display a plurality of geofeeds via a snippet view, where only highest ranked content is displayed for each geofeed. The snippet view may be implemented using the map view, the collage view, the list view, and/or other user interface views.

Various other objects, features, and advantages of the invention will be apparent through the detailed description of the preferred embodiments and the drawings attached hereto. It is also to be understood that both the foregoing general description and the following detailed description are exemplary and not restrictive of the scope of the invention.

BRIEF DESCRIPTION OF THE DRAWINGS

FIG. 2 illustrates a process for ranking a plurality of content items associated with a geofeed, according to an aspect of the invention.

FIG. 3 illustrates a process for ranking a plurality of geofeeds, according to an aspect of the invention.

DETAILED DESCRIPTION OF THE INVENTION

Figure 1:
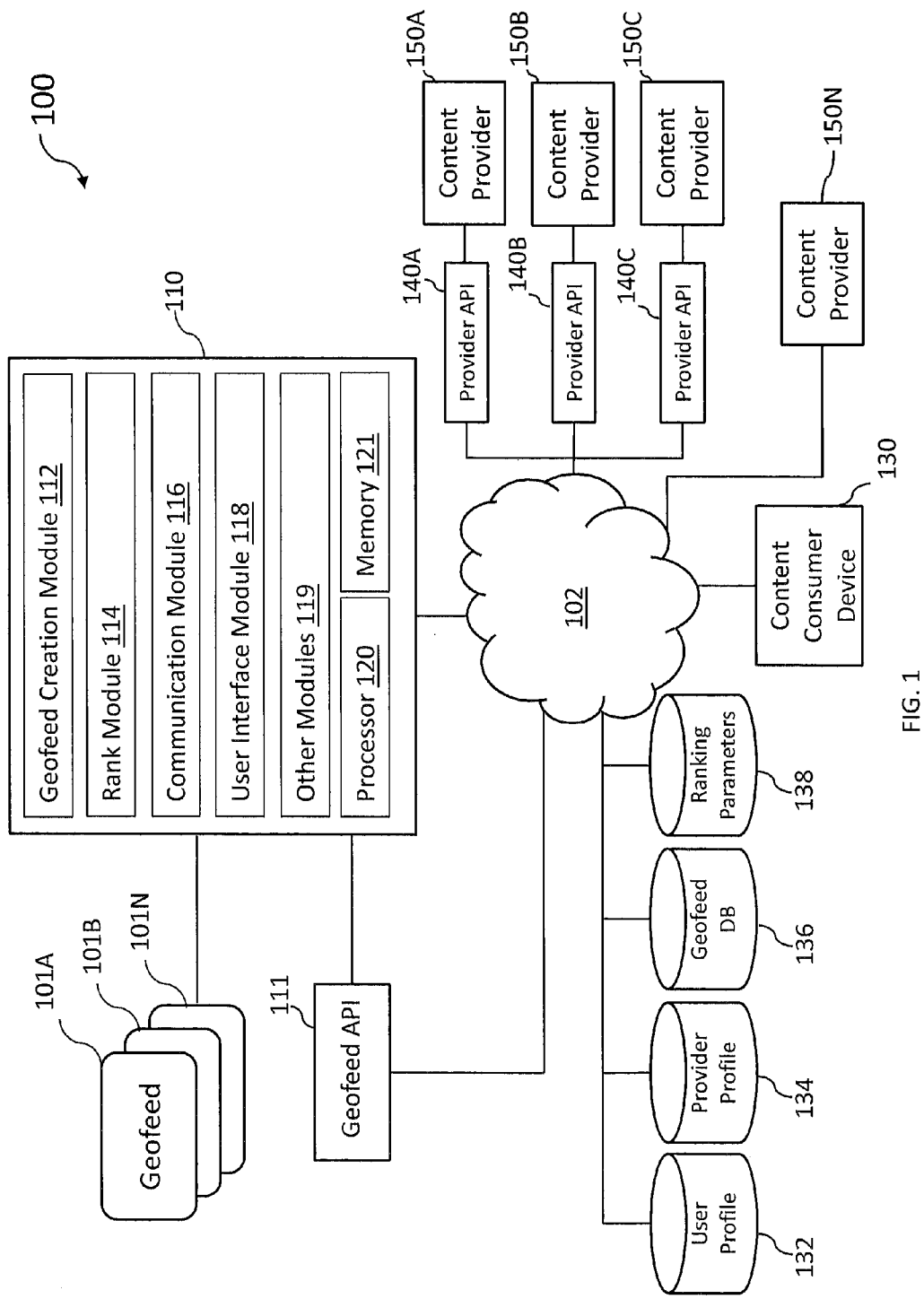
FIG. 1 illustrates a system of ranking a plurality of geofeeds and content therein, according to an aspect of the invention.

FIG. 1 illustrates a system 100 of ranking geofeeds and/or content within a geofeed, according to an aspect of the invention. A geofeed includes a collection of content, aggregated from various content providers, that is relevant to a geographically definable location (hereinafter, a "geo-location"). The aggregated content (also referred to herein as "geofeed content") may include, for example, video, audio, images, text, hyperlinks, and/or other content that may be relevant to a geo-location.

The content providers may include, for example, social media platforms (e.g., FACEBOOK, TWITTER, INSTAGRAM, FLICKR, etc.), online knowledge databases, and/or other providers that can distribute content that may be relevant to a geo-location. The geo-location may be specified by a boundary, geo coordinates (e.g., latitude, longitude, altitude/depth), an address, a school, a place name, a point of interest, a zip code, a city, a state, a country, and/or other information that can spatially identify an area. The content may be generated by content sources such as individuals, corporations, and/or other entities that may create content. As used hereinafter, "a location," "a geo-location," "a geographically definable location," and similar language is not limited to a single location but may also refer to one or more such locations.

In many instances the created content can be automatically tagged with information such as user identifications, date/time information or geographic information that specifies a location where the content was created. For example, cameras equipped with Global Positioning Satellite ("GPS") units or other location-aware systems may embed into an image file latitude/longitude coordinates that indicate where a picture was taken. In addition, modern hand-held devices such as smartphones may be equipped with a GPS sensor, which allows users to generate content (text, photos and videos) with their devices and immediately share the content through a plurality of social networks. Moreover, some devices allow users to manually input the foregoing and other information for embedding into the content. Furthermore, editing software may allow a user to embed or otherwise associate information along with the content after the content was created.

System 100 may include a computer 110, a geofeed API 111, a content consumer device 130, provider APIs 140, content providers 150, and/or other components. In some implementations, computer 110 may include one or more processors 120 configured to perform some or all of a functionality of a plurality of modules, which may be stored in a memory 121. For example, the one or more processors may be configured to execute a geofeed creation module 112, a rank module 114, a communication module 116, a user interface module 118, and/or other modules 119.

Geofeed creation module 112 may be configured to create one or more geofeeds 101 (illustrated in FIG. 1 as geofeed 101A, 101B, . . . , 101N), as described in U.S. patent application Ser. No. 13/284,455, filed Oct. 28, 2011, entitled "SYSTEM AND METHOD FOR AGGREGATING AND DISTRIBUTING GEOTAGGED CONTENT," and U.S. patent application Ser. No. 13/619,888, filed Sep. 14, 2012, entitled "SYSTEM AND METHOD FOR GENERATING, ACCESSING, AND UPDATING GEOFEEDS" both of which are incorporated by reference herein in their entirety.

Geofeed creation module 112 may format a request for a geofeed specific for different provider APIs 140 (illustrated in FIG. 1 as API 140A, 140B, . . . , 140N). The provider APIs may facilitate receiving content from corresponding content providers 150 (illustrated in FIG. 1 as content providers 150A, 150B, 150C). In some implementations, geofeed creation module 110 may format a request directly for content provider 150N without using a corresponding API. Formatting instructions may be stored at a provider profile 134. A content consumer device 130 may request and view geofeeds 101 created by geofeed creation module 112.

In some implementations, rank module 114 may be configured to obtain one or more ranking parameters that specify one or more attributes to be used to rank individual content with respect to other content within a geofeed and/or rank individual geofeeds with respect to other geofeeds. Rank module 114 may obtain the ranking parameters in various ways. For example, ranking parameters may be stored in and retrieved from ranking parameters database 138, a user profile 132 related to a content consumer, and/or other database or storage. A content consumer may save as a default and/or a preference setting in the user profile 132 one or more ranking parameters to be used for ranking geofeeds and/or content items within geofeeds. Ranking parameters may be dynamically determined by user input. For example, a content consumer may specify, via a user interface, a ranking parameter to sort geofeeds and/or content items.

In some implementations, a rank parameter may involve evaluating multiple different attributes to determine rankings. In these implementations, the attributes may be weighted based on predetermined rules, user input, and/or other weight.

Rank module 114 may be configured to rank aggregated content within an individual geofeed with respect to other content within the individual geofeed based on the ranking parameters and the attributes of the individual content. Similarly, rank module 114 may be configured to rank geofeeds with respect to other geofeeds based on the ranking parameters and the attributes of the geofeeds.

In some implementations, rank module 114 may be configured to rank individual content within a geofeed based on spatial attributes of the individual content. Spatial attributes of the individual content may include geographic information that specifies a geo-location where a particular content item was created, updated, and/or published (e.g., address, geo-coordinates, etc.). For example, rank module 114 may obtain a distance between geo-coordinates associated with each of the content items and a location such as the center of the geo-location. Rank module 114 may determine a rank based on the obtained distance and ranking parameter that indicates that distance should be used to rank the content. In this manner, content within an individual geofeed that is closer to a center or other location of interest within the geo-location may be ranked differently (e.g., higher) than other content.

In another example, a content item that is relevant to (e.g., created at) an altitude that is closer to the altitude related to a geo-location may receive a higher rank than another content item that is relevant to an altitude that is further from the altitude related to the geo-location.

In some implementations, rank module 114 may be configured to rank the content items of a geofeed based on a cluster density associated with at least a portion or subset of all of the content items in the geofeed. A cluster of content items may be formed when a group of more than one content item shares spatial attributes that are common to one another. For example, content items may form a cluster when the distance between the locations where the content items were created is less than a predetermined distance and/or within a predetermined radius.

Rank module 114 may require a cluster to have a certain minimum density (e.g., a minimum number of content items required for a cluster). The minimum density may be predefined, configurable, and/or otherwise be adjustable. Content items included in one or more clusters may be ranked differently (e.g., higher) than those content items outside of clusters. When there is more than one cluster identified in a geofeed, rank module 114 may calculate a cluster density (e.g., a number of content items per cluster per area) for each cluster and assign a higher rank to content items that belong to a cluster with a higher cluster density.

Rank module 114 may be configured to rank the content items of a geofeed based on their spatial relevance to one or more popular locations. Popular locations such as landmarks, monuments, government buildings, locations with high population density, etc., may be predefined and stored in the ranking parameters database 138. For example, rank module 114 may assign a higher rank to a content item related to (e.g., created at) a location that is closer to a popular location than a content item that is further from the popular location.

In some implementations, rank module 114 may be configured to rank individual content within a geofeed based on temporal attributes of the individual content. Temporal attributes may include a date/time when a content item was created, updated, published, viewed by others, commented on by others, a date/time when a content item was streamed (e.g., communicated) from content providers 150, and/or other date or time related to the content. Rank module 114 may compare temporal attributes associated with the content items against one another and determine a rank for each of the content items based on the comparison and ranking parameter that indicates that temporal attributes should be used to rank content. For example, content items may be ranked in order of most recently created (or modified, published, etc.).

In another example, content consumers may view and/or leave comments on a particular content item returned as part of a geofeed via the user interface described herein (e.g., as opposed to comments made via social media or other provider sites). Temporal attributes related to content items that have been viewed and/or commented on by content consumers may be generated and/or stored in geofeed database 136 and/or any other database linked to the computer 110.

In another example, a geofeed may be streamed where the stream may include content that may be relevant to a geo-location that is continuously or otherwise regularly updated. For example, content that is relevant to a particular geo-location (and complies with geofeed parameters (if any)) may be streamed continuously or at regular intervals. For example, content items may be ranked in order of mostly recently streamed.

In some implementations, rank module 114 may be configured to rank individual content within a geofeed based on popularity attributes. Popularity attributes may include a number of views (e.g., total number of views, number of views in the past month, etc.), a number of comments (e.g., total number of comments, number of comments in the past month, etc.) associated with a content item, a number of "likes," "shares," and/or other popularity attribute. For example, rank module 114 may obtain a number of comments made for individual ones of the content items in a geofeed and assign a rank to the content items based on the counted number (e.g., the content items may be ranked in decreasing order of the counted number) and ranking parameter that indicates that popularity should be used to rank the content.

For example, rank module 114 may obtain the number of comments made for each of the content items in a geofeed and assign a rank to each of the content items based on the counted number (e.g., the content items may be ranked in decreasing order of the counted number). In addition, content ratings may be used to influence the ranking of content items. For example, rank module 114 may assign a higher rank to a content item with higher average content ratings compared to other content items. A content rating system may be employed to collect, maintain, and/or store content ratings for individual content items. The content ratings may be manually created, updated, and/or removed by users of content providers and/or content consumers. Content providers and/or the computer 110 may automatically create, update, and/or remove the ratings.

In some implementations, rank module 114 may be configured to rank individual content within a geofeed based on subject matter or category (e.g., news, politics, sports, fashion, entertainment, business, technology, travel, health, government, etc.) related to individual content items. For example, content items related to a particular subject matter (e.g., news) may be ranked differently (e.g., higher or lower) than those items related to different subject matter. For example, content items related to a particular subject matter (e.g., news) may be ranked differently (e.g., higher or lower) than those items that belong to different subject matter. In some implementations, rank module 114 may be configured to rank content based on tags such as, for example, keywords, annotations made by users, and/or other tags.

In another example, content items may be ranked based on a number of subject matters to which each of the content items is assigned. When a content item is related to multiple different subject matter, that content item may be ranked higher than other content items that are associated with lesser numbers of subject matter. Content items may be automatically tagged with one or more subject matter based on information such as content, type of content, content creator, content provider, and/or other attributes associated with the content items. In addition, a content consumer and/or a content creator (e.g., social media user) may manually assign one or more subject matter tags to a particular content item.

In some implementations, rank module 114 may be configured to rank individual content within a geofeed based on identification information that identifies content creators (e.g., social media users) who created the content items. For example, identification information may identify an individual, an organization, a group, an advertiser, etc., a particular user's occupation, and/or other identification information received from one or more content providers should be ranked higher than other identities. For example, a particular news journalist or other content creator may often create interesting content. The ranking parameter may specify that that content from that particular news journalist should be ranked higher than content from other content creators based on a higher level of trust in content from a journalist as opposed to others.

In some implementations, rank module 114 may be configured to rank individual content within a geofeed based on attributes related to content creators such as a trust level, a popularity level, an activity level, and/or other attributes associated with individual content creators. A user rating system may be employed to facilitate a determination of the trust level. A user rating system may be operated by an individual content provider and/or by the computer 110 in some embodiments. For example, rank module 114 may assign a higher rank to a content item whose creator has been rated higher by the user rating system. In addition, content items may be ranked based on the popularity level associated with individual content creators. For example, a number of followers (and/or friends, fans, etc.) associated with individual content creators may determine the popularity level for each individual content creator. Similarly, rank module 114 may determine rank scores based on the level of activity associated with individual content creators. The activity level may be determined based on a number of posts (e.g., a total number of posts, number of posts in the past month, etc.) and/or any other updates made by a particular content creator through one or more content providers. For example, content items created by more active content creators may be ranked higher than those created by content creators with less activity and/or overall usage.

In some implementations, subject matter and/or categories (e.g., news, politics, sports, fashion, entertainment, business, technology, travel, health, government, etc.) related to individual content creators may influence the ranking. For example, content items whose creators belong to a particular subject matter (e.g., news) may be assigned a higher rank than those items created by content creators in different categories. In another example, content items may be ranked in order of a number of subject matters to which each of the content creators is assigned. When a content creator belongs to multiple different categories, content items created by that content creator may be ranked higher than other content items whose creators are associated with less number of subject matters. Content creators may be automatically tagged with one or more subject matters based on information such as content and type of content created, identification information of content creators, and/or other attributes associated with content creators. In addition, a content consumer and/or a content creator may manually assign one or more subject matters to a particular content creator.

In some implementations, rank module 114 may rank individual content within a geofeed based on a relationship between a content consumer (e.g., a user who makes a request to create and/or retrieve a geofeed) and a content creator whose content is in the geofeed requested by the content consumer. For example, the content consumer may have been following a particular content creator on a social media site such as TWITTER. In this case, rank module 114 may rank the content created by that particular content creator higher than content created by other content creators whom the content consumer is not following.

In some implementations, rank module 114 may be configured to rank individual content within a geofeed based on an identity of content providers which provided the content items. For example, a ranking parameter may specify that content aggregated from FACEBOOK should be ranked differently than content from another content provider. In this case, the geofeed content ranking module may rank content items received from FACEBOOK higher or differently than those received from other sources.

In some implementations, rank module 114 may be configured to rank a plurality of geofeeds with respect to one another. In these implementations, rank module 114 may be configured to use geofeed attributes, cumulative content attributes for individual geofeeds, and/or other attributes to rank geofeeds with respect to one another.

The geofeed attributes may describe various attributes of the geofeed such as, for example, spatial geofeed attributes (e.g., geo-locations of the geofeed), temporal geofeed attributes (e.g., when a geofeed was created), geofeed popularity (e.g., number of geofeed views, requests, etc.), subject matter geofeed attributes (e.g., the subject matter of the geofeed), identification content attributes (e.g., who created the geofeed), and/or other geofeed attributes.

Cumulative content attributes refer to content attributes of an individual geofeed that are cumulated (e.g., added, averaged, mean valued, etc.) to generate a geofeed rank score or other value that may be used to compare with geofeed rank scores for other geofeeds whose content attributes have been similarly cumulated. In this manner, a geofeed may be ranked with respect to another geofeed based on their respective content. For example, a content consumer may be looking for geofeeds that include a greater number of popular content items. In this example, a number of "likes" (e.g., FACEBOOK "Likes") and/or votes made by users to each individual content item may be compared against one another to determine a content rank score for the individual content items. Rank module 114 may aggregate content rank scores to determine an aggregate content rank score for each individual geofeed and rank the plurality of geofeeds based on the aggregate content rank score.

Rank module 114 may be configured to obtain one or more ranking parameters to be used to rank the plurality of geofeeds. Ranking parameters may be stored in and retrieved from ranking parameters database 138, a user profile 132 related to a content consumer, and/or other storage. For example, a content consumer may save as a default and/or preference setting in user profile 132 one or more ranking parameters to be used for ranking a plurality of geofeeds. Ranking parameters may be dynamically obtained from user input. For example, a content consumer may specify, via a user interface, a ranking parameter to sort a plurality of geofeeds. If not otherwise specified by user input, rank module 114 may retrieve one or more ranking parameters from storage and/or may use default parameters. If ranking parameters relates to more than one attribute to determine rank, any one of the attributes may be weighted by predetermined rules, user input, etc.

In some implementations, rank module 114 may be configured to rank a geofeed with respect to other geofeeds based on spatial attributes of a geofeed. Spatial attributes of a geofeed may include one or more geo-locations for a particular geofeed. For example, when a request to create a geofeed for a particular geo-location is received, previously requested geofeeds relevant to their respective geo-locations may be ranked based on the proximity of the respective geo-locations to the particular geo-location. A geofeed having a geo-location that is closer in distance to the particular geo-location may be ranked higher than another geofeed having a geo-location that is further from the particular geo-location. In this manner, potential geo-locations of interest may be presented to a user based on an input geo-location.

Rank module 114 may be configured to rank the geofeeds based on their spatial relevance to one or more popular locations. Popular locations such as landmarks, monuments, government buildings, locations with high population density, etc. may be predefined and stored in ranking parameters database. For example, rank module 114 may assign a higher rank score to a geofeed created based on a geo-location that is closer to one of the popular locations defined in ranking parameters database 138.

In some implementations, the rank module 114 may be configured to rank a geofeed with respect to other geofeeds based on temporal attributes of a geofeed. Temporal attributes of a geofeed may include a date/time when a geofeed was created, requested, updated, published, viewed by others, commented on by others, and/or other date/time related to a geofeed. The geofeed rank module may compare temporal attributes associated with each one of the plurality of geofeeds against one another and determine a rank for the individual geofeeds based on the comparison.

In some implementations, content consumers may view and/or leave comments on a particular geofeed. Temporal attributes related to geofeeds that have been viewed and/or commented on by content consumers may be generated and/or stored in geofeed database 136 and/or other database.

In some implementations, the geofeed rank module may be configured to rank a geofeed with respect to other geofeeds based on popularity attributes of a geofeed. Popularity attributes of a geofeed may include a number of views (e.g., total number of views, number of views in the past month, etc.), requests (e.g., a number of times a particular previously requested geofeed has been retrieved), and/or a number of comments (e.g., total number of comments, number of comments in the past month, etc.) associated with a particular geofeed.

For example, a content consumer may want to sort the geofeeds based on their popularity. In this case, the plurality of geofeeds may be ranked in order of a number of views (e.g., a number of times a particular geofeed has been viewed by other users) that is associated with each individual geofeed.

Comments may include messages, votes, links, flags, etc. For example, rank module 114 may obtain the number of comments made for each of the geofeeds and assign a rank score to each of the geofeeds based on the counted number (e.g., the geofeeds may be ranked in decreasing order of the counted number). In addition, geofeed ratings may be used to influence the ranking of geofeeds. For example, rank module 114 may assign a higher score to a geofeed with higher average ratings compared to other geofeeds. A geofeed rating system may be employed to collect, maintain, and/or store ratings for individual geofeeds. The geofeed ratings may be manually created, updated, and/or removed by content consumers. In some implementations, user interface module 118 may facilitate creation, update, and/or removal of the geofeed ratings.

In some implementations, the rank module 114 may be configured to rank a geofeed with respect to other geofeeds based on subject matter or categories (e.g., news, politics, sports, fashion, entertainment, business, technology, travel, health, government, etc.) of the geofeed. For example, geofeeds related to a particular subject matter (e.g., news) may be ranked higher than geofeeds having different subject matter.

In some implementations, geofeeds may be automatically tagged with one or more subject matters based on information such as geofeed content, geofeed creators, and/or other attributes associated with the geofeeds. In addition, user interface module 118 may be configured to receive from a content consumer a manually assigned subject matter to be associated with a particular geofeed. When a request to search for a particular geofeed that has been previously requested and/or stored in geofeed database is received where the search request may comprise a subject matter (and/or topic, category, etc.) of interest, rank module 114 may compare the one or more subject matter associated with each of the individual geofeeds to the subject matter of interest identified in the search request. Rank module 114 may then determine a rank score based on the comparison.

In some implementations, rank module 114 may be configured to rank a geofeed with respect to other geofeeds based on a number of content items that are associated with each individual geofeed. Geofeeds may be ranked in order of the number of content items associated with the individual geofeeds.

In some implementations, rank module 114 may be configured to rank a geofeed with respect to other geofeeds based on an identification of geofeed creators who created the geofeed. A geofeed creator may include an individual or other entity that requested a geofeed. For example, certain users may request (e.g., cause the creation of) more interesting geofeeds than other users. Rank module 114 may be configured to use a ranking parameter that identifies such geofeed creators/requesters in order to rank those geofeeds higher than others. For example, geofeed rank module 114 may store ranking parameters that specify that geofeeds created by certain users (e.g., a particular journalist) should be ranked higher than geofeeds created by other users.

Various attributes related to geofeed creators may be used to influence ranking decisions. Such attributes may include, without limitation, a type of geofeed creator (e.g., an individual, organization, group, advertiser, etc.), an occupation of a geofeed creator (e.g., a news journalist, government official, politician, celebrity, etc.), a trust level, a popularity level, an activity level, and/or other information that may be known about a geofeed creator. Such information may be stored in a memory such as user profile 132.

A user rating system may be employed by user interface module 118 to facilitate a determination of the trust level. For example, rank module 114 may assign a higher score to a geofeed whose creator has been rated higher by the user rating system. In addition, geofeeds may be ranked based on the popularity level associated with individual geofeed creators. For example, a number of followers (and/or friends, fans, etc.) associated with individual geofeed creators may determine the popularity level for each individual geofeed creator. Similarly, rank module 114 may determine rank scores based on the level of activity associated with individual geofeed creators. The activity level may be determined based on a number of geofeeds created and/or requested (e.g., a total number of geofeeds, number of geofeeds in the past month, etc.) and/or other activity and/or usage data related to a particular geofeed creator. For example, geofeeds created by more active geofeed creators may be ranked higher than those created by geofeed creators with less activity and/or overall usage.

Furthermore, one or more subject matters and/or categories (e.g., news, politics, sports, fashion, entertainment, business, technology, travel, health, government, etc.) related to individual geofeed creators may influence the ranking. For example, geofeeds whose creators belong to a particular subject matter (e.g., news) may be assigned a higher rank score than those geofeeds created by geofeed creators in different categories. In another example, geofeeds may be ranked in order of a number of subject matters to which each of the geofeed creators is assigned. When a geofeed creator belongs to multiple different categories, geofeeds created by that geofeed creator may be ranked higher than other geofeeds whose creators are associated with less number of subject matters, Geofeed creators may be automatically tagged with one or more subject matters based on information such as geofeed content and type of geofeeds created, identification information of geofeed creators, and/or other attributes associated with geofeed creators. In addition, one or more subject matters may be manually assigned to a particular content creator by user input.

In some implementations, rank module 114 may be configured to assign a content rank score to a content item and/or a geofeed. If ranking parameters for content and/or a geofeed involve evaluating multiple different attributes related to content items and/or geofeeds to determine rank scores, any one of the attributes may be weighted by predetermined rules, user input, etc. Ranking may be based on a plurality of ranking parameters. In these implementations, rank module 114 may rank the content and/or geofeeds based on the rank scores generated for either or both.

In some implementations, a geofeed may be ranked based on a combination of any cumulative content attributes and geofeed attributes. For example, such parameters may include "rank geofeeds based on proximity to the White House using geo-locations (e.g., a geofeed attribute) and having popular content (e.g., cumulative content views per geofeed)." Other combinations and numbers of attributes may be used to rank the geofeeds as well.

The communication module 214 may communicate the plurality of geofeeds ranked according to the rank scores determined by rank module 114.

User interface module 118 may be configured to generate a user interface that displays the ranked content within a geofeed and/or the ranked geofeeds. For example, user interface module 118 may display the ranked content and/or geofeeds via a map view that highlights or otherwise differentially displays higher-ranked content from lower-ranked content on a map, a collage view that highlights or otherwise differentially displays higher-ranked content from lower-ranked content on a collage display, a list view that highlights or otherwise differentially displays higher-ranked content from lower-ranked content on a list, and/or other views.

In some embodiments, user interface module 118 may display a plurality of geofeeds via a snippet view, where only highest ranked content is displayed for each geofeed. The snippet view may be implemented using the map view, the collage view, the list view, and/or other user interface views.

Figure 4:
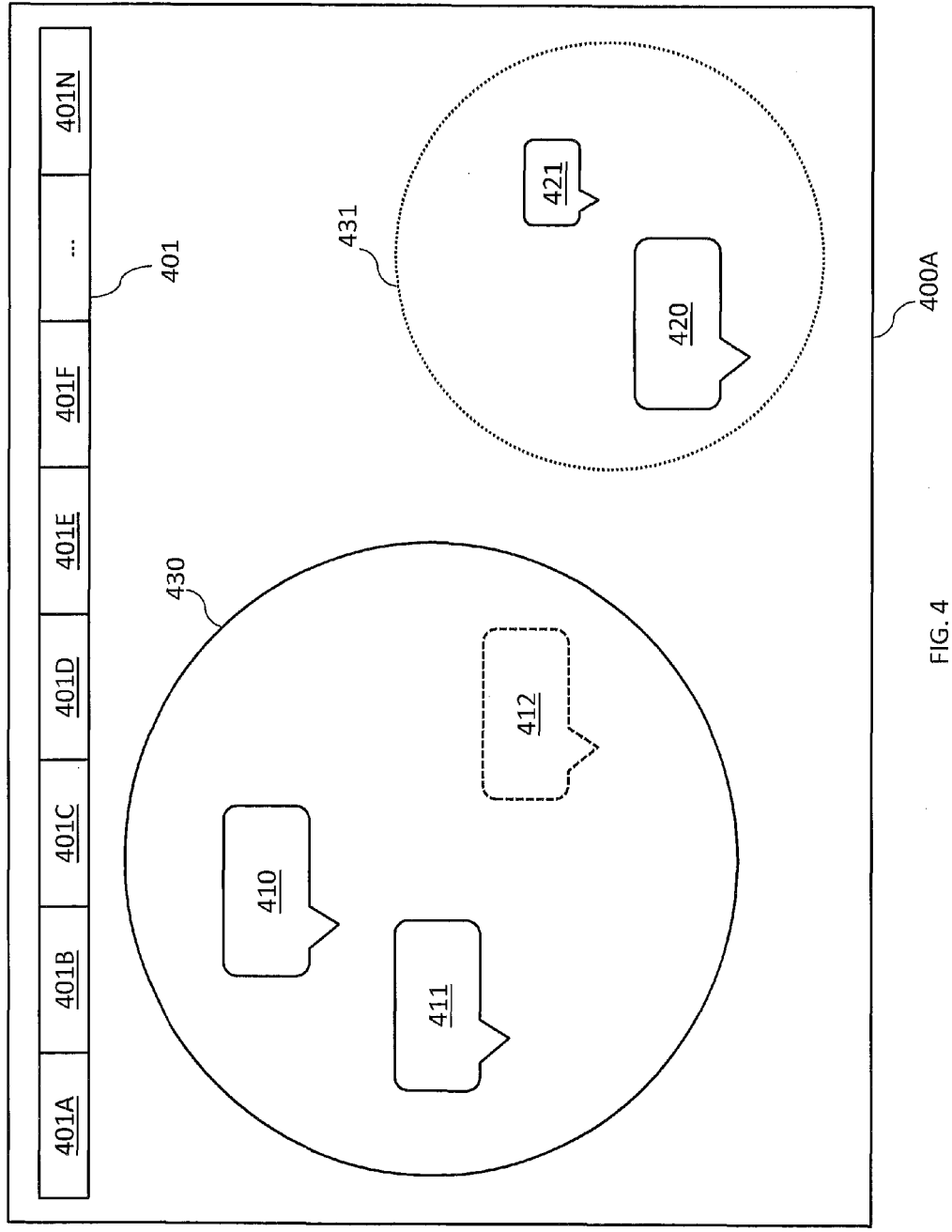
FIG. 4 illustrates a screenshot of an interface for communicating geofeed results, according to an aspect of the invention.
Figure 5:
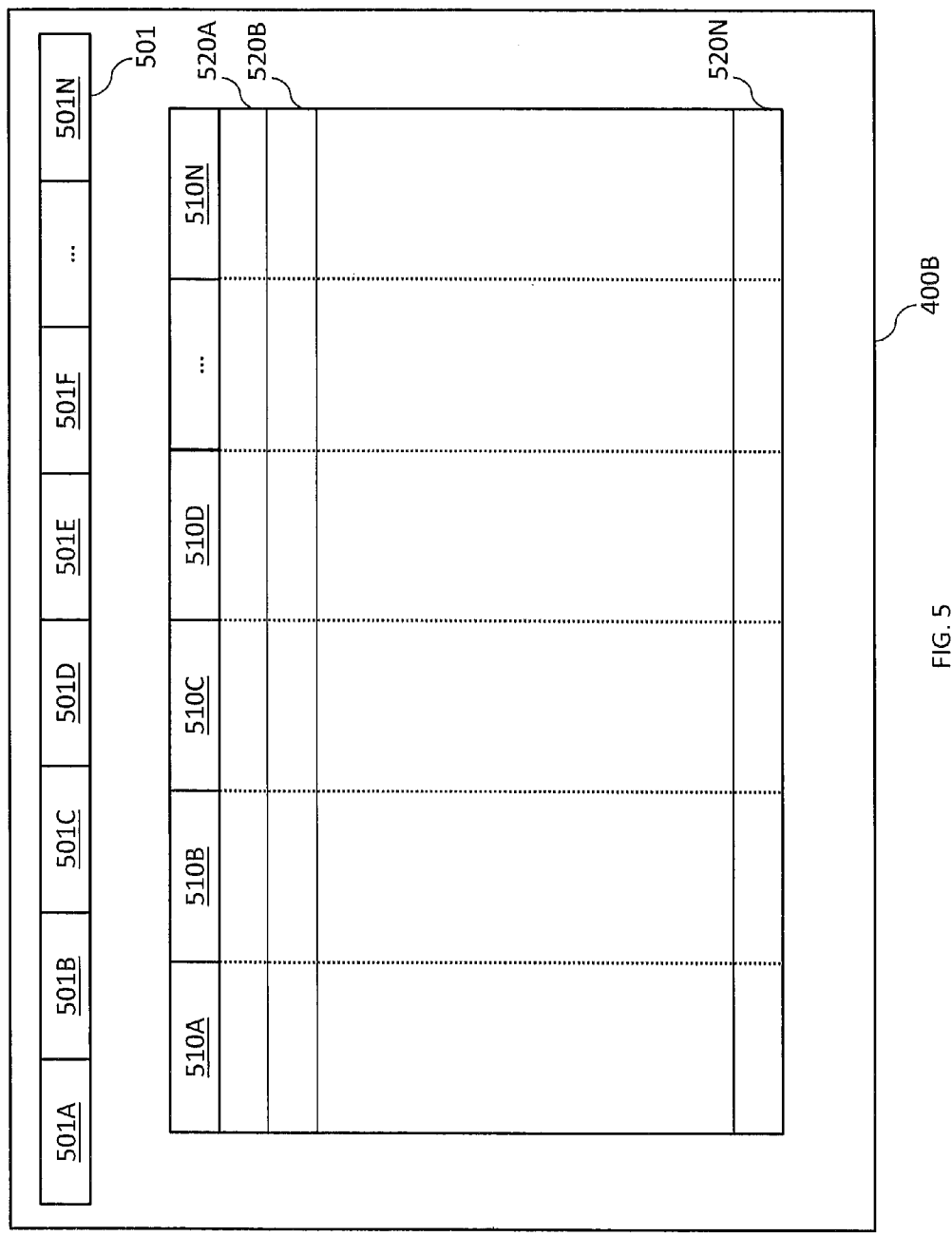
FIG. 5 illustrates a screenshot of an interface for communicating geofeed results, according to an aspect of the invention.
Figure 6:
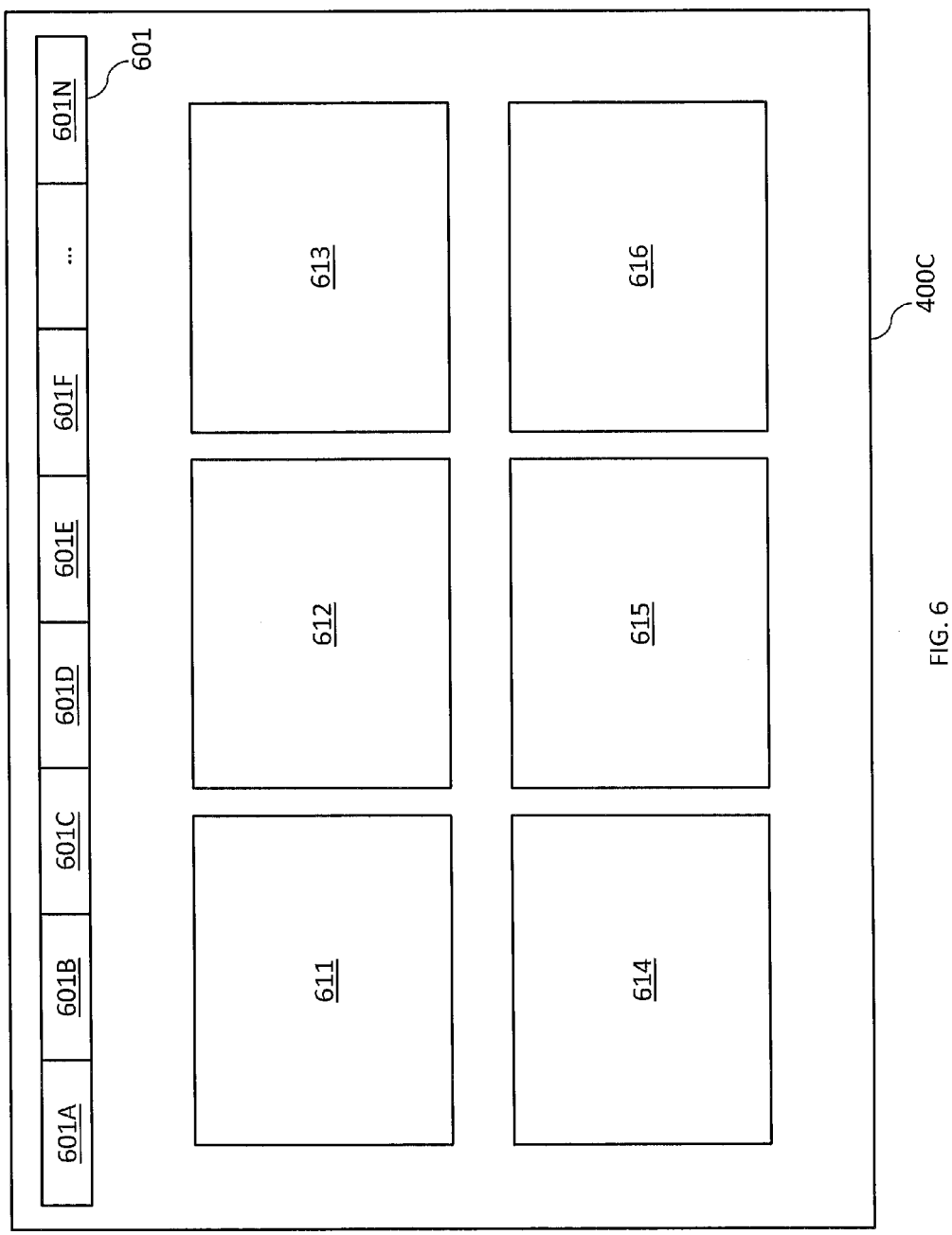
FIG. 6 illustrates a screenshot of an interface for communicating geofeed results, according to an aspect of the invention.

Exemplary screenshots of interfaces for generated by user interface module 118 are illustrated in FIGS. 4-6.

Those having skill in the art will recognize that computer 110 and content consumer device 130 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

One or more applications, including various modules, may be loaded into memory and run on an operating system of computer 110 and/or consumer device 130. In one implementation, computer 110 and consumer device 130 may each comprise a server device, a desktop computer, a laptop, a cell phone, a smart phone, a Personal Digital Assistant, a pocket PC, or other device.

Network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

FIG. 2 illustrates a process 200 for ranking a plurality of content items associated with a geofeed, according to an aspect of the invention. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, process 200 may include obtaining a plurality of content items associated with a geofeed. The geofeed may be created and/or retrieved by computer 110.

In an operation 204, process 200 may identify and/or select one or more ranking parameters to be used to rank the plurality of content items. For example, a content consumer may specify, via a user interface, a ranking parameter to sort the content items based on temporal attributes (e.g., the creation time, update time, etc.) or other attribute of the individual content items. In another example, ranking parameters may be predefined by computer 110 and/or by a content consumer, which may be used to rank the content items. The pre-ranked content items generated in this manner may be stored in geofeed database 136 for later retrieval.

In an operation 206, process 200 may include determining a rank score for each individual content item based on the identified ranking parameters and attributes related to the individual content items. For example, when a request to create a geofeed bounded by a geo-location defined by a circle, polygon, zip code, etc. is received, process 200 may calculate the distance between geo-coordinates associated with each of the content items and the center of the circle, polygon, or an area covered by the zip code. Process 200 may determine a rank score based on the calculated distance. In another example, when the identified ranking parameters have been already predefined, rather than specified, via a user interface, by a content consumer, for example, the predefined ranking parameters may be used to determine a rank score for each individual content item.

In an operation 208, process 200 may include ranking and/or sorting the plurality of content items in the geofeed based on the rank scores determined in operation 206.

In an operation 210, process 200 may include communicating the geofeed comprising the plurality of content items ranked according to the rank scores. The geofeed having ranked content may be communicated via one or more communication channels such as, for example, SMS text, email, content delivered to a client application such as a mobile application, a website, and/or other communication channel. In some implementations, the geofeed may be communicated via a user interface such as a web page, mobile application, and/or other interface.

FIG. 3 illustrates a process 300 for ranking a plurality of geofeeds, according to an aspect of the invention.

In an operation 302, process 300 may include obtaining a plurality of geofeeds where the plurality of geofeeds may be created and/or retrieved by computer 110.

In an operation 304, process 300 may identify and/or select one or more ranking parameters to be used to rank the plurality of geofeeds obtained in operation 302 according to one or more attributes of the individual ones of the plurality of geofeeds and/or content items therein. For example, a content consumer may specify, via a user interface, a ranking parameter to sort the geofeeds based on temporal attributes (e.g., the creation time, update time, etc.) of the individual geofeeds. In another example, ranking parameters may be predefined by computer 110 and/or by a content consumer, which may be used to rank the geofeeds. The pre-ranked geofeeds generated in this manner may be stored in geofeed database 136 for later retrieval.

In an operation 306, process 300 may determine a rank score for each individual geofeed based on the identified ranking parameters and attributes related to the individual geofeeds and/or content items therein. For example, when a request to search for a particular geofeed that has been previously requested and/or stored in geofeed database 136 is received where the search request may comprise a location of interest, process 300 may compare the one or more geo-locations associated with each of the individual geofeeds to the location of interest identified in the search request. For example, a geofeed with a geo-location that is closer in distance to the location of interest identified in the search request may be ranked higher than another geofeed having a geo-location that is further from the location of interest. In another example, where the identified ranking parameters have been already predefined, rather than specified, via a user interface, by a content consumer, for example, the predefined ranking parameters may be used to determine a rank score for each individual geofeed.

In an operation 308, process 300 may rank and/or sort the plurality of geofeeds according to the rank scores determined in operation 306.

In an operation 310, process 300 may include communicating the plurality of geofeeds ranked according to the rank scores. The ranked plurality of geofeeds may be communicated via one or more communication channels such as, for example, SMS text, email, content delivered to a client application such as a mobile application, a website, and/or other communication channel. In some implementations, the geofeeds may be communicated via a user interface such as a web page, mobile application, and/or other interface.

FIG. 4 illustrates a screenshot of an interface 400A for communicating geofeed results, according to an aspect of the invention. The screenshots illustrated in FIG. 4 and other drawing figures are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting.

Interface 400A and other interfaces described herein may be implemented as a web page communicated from computer 110 to a client, an application such as a mobile application executing on the client that receives generates the interface based on information communicated from computer 110, and/or other interface. Whichever type of interface is used, computer 110 may communicate the data and/or formatting instructions related to the interface to the client, causing the client to generate the various interfaces of FIG. 4 and other drawing figures. Furthermore, computer 110 may receive data from the client via the various interfaces, as would be appreciated.

To switch between the various interfaces 400 illustrated in FIGS. 4-6, each interface 400 may include a navigation element (not illustrated) having links or other controls that switch between the "MAP" display illustrated by FIG. 4, the "COLLAGE" display illustrated by FIG. 5, and the "LIST" display illustrated by FIG. 6.

Referring to FIG. 4, interface 400A may provide different ways in which to rank a plurality of geofeeds and content items therein. For example, interface 400A may include a ranking parameters control element 401 that identifies one or more ranking parameters (illustrated in FIG. 4 as ranking parameter 401A, 401B, . . . , 401N). Via ranking parameters control element 401, a content consumer may specify one or more ranking parameters to be used to score a plurality of geofeeds and/or a plurality of content items associated with a particular geofeed. For example, a content consumer may select ranking parameter 401A to rank and/or sort a plurality of geofeeds and/or content items therein based on the ranking parameter 401A. In some implementations, different ranking parameters 401 may be configured to relate to content attributes while others may relate to geofeed attributes.

Interface 400A may include ranked results displayed in such a way that the rank order may be visually and/or graphically represented by various types of visual indicators. The rank order may be represented by varying the size of graphical indicia of content items, the thickness and/or the type of border line surrounding geofeeds and/or graphical indicia of content items, and/or other various types of visual indicators. In this way, content within a geofeed may be ranked with respect to other content and be displayed differently based on their respective rankings on user interface 400A, for example.

For example, as illustrated, a circle 430 having a radius and center (not illustrated) is displayed that indicates a boundary of a geofeed. User interface 400A may show circle 430 in solid line where the geofeed represented by circle 430 is one of the Top N geofeeds based on one or more ranking parameters selected via ranking parameters control element 401. On the other hand, interface 400A may show circle 431 in dashed line if the geofeed represented by circle 431 is not one of the Top N geofeeds. For example, the geofeed represented by circle 430 may be ranked differently (e.g., higher) than the geofeed represented by circle 431 and may be accordingly displayed differently. The geofeed represented by circle 430 includes content indicators 410, 411, and 412, which provide graphical indicia of content items of the geofeed. The content items may be provided from different or the same content provider. Content item 410, 411, and 412 may each include an icon, a logo, and/or other identifying indicia that indicate the source of the content and/or a type of content. User interface 400A may show content indicators 410, 411, and 420 in solid line when the corresponding content items indicated by content indicators 410, 411, and 420 is one of the Top N content items based on one or more ranking parameters selected via ranking parameters control element 401. On the other hand, interface 400A may show content indicator 412 in dashed line where the corresponding content item indicated by content indicator 412 is not one of the Top N content items. In another example, interface 400A may show content indicator 421 smaller in size relative to another content indicator such as content indicator 420 when the corresponding content item indicated by content indicator 421 is ranked differently (e.g., lower) than the corresponding content item indicated by content indicator 420.

FIG. 5 illustrates a screenshot of an interface 400B for communicating geofeed results, according to an aspect of the invention.

Referring to FIG. 5, interface 400B may provide different ways in which to rank a plurality of geofeeds and content items therein. For example, interface 400B may include a ranking parameters control element 501 that identifies one or more ranking parameters. Via ranking parameters control element 501, content consumer may specify one or more ranking parameters to be used to score a plurality of geofeeds and/or a plurality of content items associated with a particular geofeed. For example, content consumer may select a ranking parameter 501A to rank and/or sort a plurality of geofeeds and/or content items therein based on the ranking parameter 501A.

Interface 400B may include a "LIST" view that includes content elements 520A-N listed in tabular form in order of ranking determined based on one or more ranking parameters identified via ranking parameters control element 501. The content elements may each represent a content item. Content elements 520A-N may include information displayed by content indicators described with respect to interface 400A and/or other information related to content items. In some implementations, the "LIST" view may communicate the geofeed to the requestor in a compact UI format or for electronic data transfer such as a Javascript Object Notation list (JSON), RSS (and GeoRSS, ATOM), or comma separated values.

In some implementations, interface 400B may include a "LIST" view that includes geofeed elements 520A-N listed in tabular form in order of ranking determined based on one or more ranking parameters identified via ranking parameters control element 501. The geofeed elements may each represent a geofeed. Geofeed elements 520A-N may include information such as geofeed creator, a time associated with the geofeed (e.g., creation time, publication time, etc.) and/or other information related to geofeeds.

FIG. 6 illustrates a screenshot of an interface 400C for communicating geofeed results, according to an aspect of the invention.

Referring to FIG. 6, interface 400C may provide different ways in which to rank a plurality of geofeeds and content items therein. For example, interface 400C may include a ranking parameters control element 601 that identifies one or more ranking parameters. Via ranking parameters control element 601, content consumer may specify one or more ranking parameters to be used to score a plurality of geofeeds and/or a plurality of content items associated with a particular geofeed. For example, content consumer may select a ranking parameter 601A to rank and/or sort a plurality of geofeeds and/or content items therein based on the ranking parameter 501A.

Interface 400C may include a "COLLAGE" view that includes content elements 611-616 arranged horizontally or vertically in order of ranking determined based on one or more ranking parameters identified via ranking parameters control element 601. The content elements may each represent a content item. Content elements 611-616 may include information displayed by content indicators described with respect to interface 400A and/or other information related to content items. For example, one or more content elements 611-616 may include the content itself such as video, photo, audio, text, etc., a content creator (e.g., social media user who posted the content), an identification of the content provider that provided the content, a time associated with the content (e.g., create time, publication time, etc.), a location where the content was created (e.g., address, geo-coordinates, etc.), and/or other information known or determined about the content.

In some implementations, Interface 400C may include a "COLLAGE" view that includes geofeed elements 611-616 arranged horizontally or vertically in order of ranking determined based on one or more ranking parameters identified via ranking parameters control element 601. The geofeed elements may each represent a geofeed. Geofeed elements 611-616 may include information such as geofeed creator, a time associated with the geofeed (e.g., creation time, publication time, etc.) and/or other information related to geofeeds.

Referring to FIGS. 4-6, any one of the views illustrated therein may display snippets of content from each geofeed, where only the top ranking content items are displayed. When displaying one or more geofeeds, content within each geofeed may be ranked with respect to other content based on the various input ranking parameters. For example, each displayed geofeed may display only the "top 10 (or other configurable number) most popular" photos related to each geofeed.

In some implementations, rank module 114 may rank the content and/or the geofeed prior to presentation on the user interfaces. In some implementations, rank module 114 may receive an indication via the user interfaces to rank or re-rank the content and/or geofeeds. In some implementations, user interface module 118 may supply instructions necessary to perform the ranking locally. In these implementations, the instructions may include the logic necessary to complete the ranking and/or may include ranking scores pre-generated by rank module 114 to simplify the ranking process at the client.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for ranking a plurality of content items of a geofeed, the system comprising:
one or more processors configured to execute computer program modules, the computer program modules comprising:
a rank module configured to:
obtain the plurality of content items associated with the geofeed, the plurality of content items aggregated from a plurality of content providers in relation to one or more geographically definable locations, the plurality of content items being provided by the plurality of content providers based on respective requests formatted specifically for individual ones of the plurality of content providers, wherein the respective requests comprise the one or more geographically definable locations;

identify one or more ranking parameters used to score the plurality of content items according to one or more content attributes related to individual ones of the plurality of content items;

generate a rank score for the individual ones of the plurality of content items based on the one or more ranking parameters and the one or more content attributes of the individual ones of the plurality of content items;

rank the plurality of content items based on the rank score for the individual ones of the plurality of content items; and a communication module configured to:

communicate the geofeed comprising the ranked plurality of content items.

2. The system of claim 1, wherein the rank module further configured to:

wherein obtaining the plurality of content items associated with the geofeed comprises:

receive a request to create a new geofeed; and generate the new geofeed; and obtain the plurality of content items associated with the new geofeed.

3. The system of claim 1, wherein the rank module further configured to:

wherein obtaining the plurality of content items associated with the geofeed comprises:

receive a request to retrieve a previously requested geofeed;

retrieve the previously requested geofeed based on the request; and obtain the plurality of content items associated with the previously requested geofeed.

4. The system of claim 1, wherein the rank module further configured to:

wherein obtaining the plurality of content items associated with the geofeed comprises:

receive a request to retrieve a previously requested geofeed;

retrieve a geofeed definition associated with the previously requested geofeed based on the request, wherein the geofeed definition comprising the one or more geographically definable locations;

generate the previously requested geofeed based on the geofeed definition; and obtain the plurality of content items associated with the previously requested geofeed.

5. The system of claim 1, wherein the rank module further configured to:

determine the one or more content attributes, the one or more content attributes comprising one or more content spatial attributes associated with the individual ones of the plurality of content items; and generate the rank score based on the one or more content spatial attributes.

6. The system of claim 5, wherein the rank module further configured to:

determine a location associated with the individual ones of the plurality of content items, wherein the location is within a geographically definable location; and obtain a distance between the location and a center of the geographically definable location, wherein generating the rank score based on the one or more content spatial attributes comprises:

generate the rank score based on the distance.

7. The system of claim 5, wherein the rank module further configured to:

identify one or more clusters that comprise a subset of the plurality of content items, wherein the subset of the plurality of content items share content spatial attributes common among the subset of the plurality of content items, wherein generating the rank score based on the one or more content spatial attributes comprises:

generate the rank score based on the one or more clusters.

8. The system of claim 1, wherein the rank module further configured to:

determine the one or more content attributes, the one or more content attributes comprising one or more content temporal attributes associated with the individual ones of the plurality of content items; and generate the rank score based on the one or more content temporal attributes.

9. The system of claim 8, wherein the rank module further configured to:

compare the one or more content temporal attributes associated with the plurality of content items against one another, wherein the content temporal attributes include a creation time or an update time, wherein generating the rank score based on the one or more content temporal attributes comprises:

generate the rank score based on the comparison.

10. The system of claim 1, wherein the rank module further configured to:

determine the one or more content attributes, the one or more content attributes comprising one or more content popularity attributes associated with the individual ones of the plurality of content items; and generate the rank score based on the one or more content popularity attributes.

11. The system of claim 10, wherein the rank module further configured to:

obtain a number of comments that were generated for the individual ones of the plurality of content items, wherein generating the rank score based on the one or more content popularity attributes comprises:

generate the rank score based on the number of comments.

12. The system of claim 1, wherein the rank module further configured to:

determine the one or more content attributes, the one or more content attributes comprising one or more types of the individual ones of the plurality of content items, the type comprising video, photo, audio, or text; and generate the rank score based on the one or more types.

13. The system of claim 1, wherein the rank module further configured to:

determine the one or more content attributes, the one or more content attributes comprising one or more subject matters related to the individual ones of the plurality of content items; and generate the rank score based on the one or more subject matters.

14. The system of claim 1, wherein the rank module further configured to:

identify a content creator of the individual ones of the plurality of content items;

determine the one or more content attributes associated with the content creator; and generate the rank score based on the one or more content attributes associated with the content creator.

15. The system of claim 1, wherein the rank module further configured to:
identify a content provider of the individual ones of the plurality of content items;
determine the one or more content attributes associated with the content provider; and
generate the rank score based on the one or more content attributes associated with the content provider.

16. The system of claim 1, the system further comprising:
a user interface module configured to:
communicate a user interface comprising the geofeed comprising the ranked plurality of content items.

17. A system for ranking a plurality of geofeeds, the system comprising:
one or more processors configured to execute computer program modules, the computer program modules comprising:
a rank module configure to:
obtain a plurality of content items associated with individual ones of the plurality of geofeeds, the plurality of content items aggregated from a plurality of content providers in relation to one or more geographically definable locations for the individual ones of the plurality of geofeeds, the plurality of content items being provided by the plurality of content providers based on respective requests formatted specifically for individual ones of the plurality of content providers, wherein the respective requests comprise the one or more geographically definable locations for individual ones of the plurality of geofeeds;
identify one or more geofeed ranking parameters used to score the plurality of geofeeds according to one or more geofeed attributes related to the individual ones of the plurality of geofeeds;
generate a geofeed rank score for the individual ones of the plurality of geofeeds based on the one or more geofeed ranking parameters and the one or more geofeed attributes related to the individual ones of the plurality of geofeeds;
rank the plurality of geofeeds based on the geofeed rank score for the individual ones of the plurality of geofeeds; and
a communication module configured to:
communicate the ranked plurality of geofeeds.

18. The system of claim 17, wherein the rank module is further configured to:
identify the one or more geofeed ranking parameters used to score the plurality of geofeeds according to one or more cumulative content attributes related to the individual ones of the plurality of geofeeds;
generate a content rank score for the individual ones of the plurality of content items based on the one or more geofeed ranking parameters and the one or more cumulative content attributes;
generate an aggregate content rank score for the individual ones of the plurality of geofeeds by aggregating a plurality of content rank scores;
rank the plurality of geofeeds based on the geofeed rank score and the aggregate content rank score; and
wherein the communication module is further configured to:
communicate the ranked plurality of geofeeds.

19. The system of claim 18, wherein the rank module is further configured to:
determine the one or more cumulative attributes related to the individual ones of the plurality of geofeeds, the one or more cumulative content attributes comprising content spatial attributes, content temporal attributes, content popularity attributes, content types, or content subject matters.

20. The system of claim 17, wherein the rank module is further configured to:
determine the one or more geofeed attributes, the one or more geofeed attributes comprising one or more geofeed spatial attributes associated with the individual ones of the plurality of geofeeds; and
generate the geofeed rank score based on the one or more geofeed spatial attributes.

21. The system of claim 20, wherein the rank module is further configured to:
receive a search request to obtain the plurality of geofeeds, wherein the search request comprising one or more locations,
wherein generating the geofeed rank score based on the one or more geofeed spatial attributes comprises:
identify the one or more geographically definable locations associated with the individual ones of the plurality of geofeeds;
obtain a distance between the one or more locations of the search request and the one or more geographically definable locations associated with the individual ones of the plurality of geofeeds; and
generate the geofeed rank score based on the distance.

22. The system of claim 17, wherein the rank module is further configured to:
determine the one or more geofeed attributes, the one or more geofeed attributes comprising one or more geofeed temporal attributes associated with the individual ones of the plurality of geofeeds; and
generate the geofeed rank score based on the one or more geofeed temporal attributes.

23. The system of claim 22, wherein the rank module is further configured to:
wherein generating the geofeed rank score based on the one or more geofeed temporal attributes comprises:
compare the one or more geofeed temporal attributes against one another, wherein the geofeed temporal attributes include a creation time or an update time; and
generate the geofeed rank score based on the comparison.

24. The system of claim 17, wherein the rank module is further configured to:
determine the one or more geofeed attributes, the one or more geofeed attributes comprising one or more geofeed popularity attributes associated with the individual ones of the plurality of geofeeds; and
generate the geofeed rank score based on the one or more geofeed popularity attributes.

25. The system of claim 17, wherein the rank module is further configured to:
obtain a number of the plurality of content items associated with the individual ones of the plurality of geofeeds;
compare the number to a predetermined threshold value; and
generate the geofeed rank score based on the comparison.

26. The system of claim 17, wherein the rank module is further configured to:
identify a geofeed creator of the individual ones of the plurality of geofeeds;

determine the one or more geofeed attributes associated with the geofeed creator; and generate the geofeed rank score based on the one or more geofeed attributes associated with the geofeed creator.

27. The system of claim 17, the system further comprising:
a user interface module configured to:
communicate a user interface comprising the ranked plurality of geofeeds.

28. A system for ranking a plurality of geofeeds, the system comprising:
one or more processors configured to execute computer program modules, the computer program modules comprising:
a rank module configured to:
obtain a plurality of content items associated with individual ones of the plurality of geofeeds, the plurality of content items aggregated from a plurality of content providers in relation to one or more geographically definable locations for the individual ones of the plurality of geofeeds, the plurality of content items being provided by the plurality of content providers based on respective requests formatted specifically for individual ones of the plurality of content providers, wherein the respective requests comprise the one or more geographically definable locations for individual ones of the plurality of geofeeds;
identify the one or more geofeed ranking parameters used to score the plurality of geofeeds according to one or more cumulative content attributes related to the individual ones of the plurality of geofeeds;
generate an content rank score for the individual ones of the plurality of content items based on the one or more geofeed ranking parameters and the one or more cumulative content attributes;
generate an aggregate content rank score for the individual ones of the plurality of geofeeds by aggregating a plurality of content rank scores;
rank the plurality of geofeeds based on the aggregate content rank score; and
a communication module configured to:
communicate the ranked plurality of geofeeds.

29. The system of claim 28, the rank module is further configured to:
determine the one or more cumulative attributes related to the individual ones of the plurality of geofeeds, the one or more cumulative content attributes comprising content spatial attributes, content temporal attributes, content popularity attributes, content types, or content subject matters.

30. The system of claim 28, the system further comprising:
a user interface module configured to:
communicate a user interface comprising the ranked plurality of geofeeds.

* * * * *